United States Patent [19]
Roth et al.

[11] Patent Number: 5,564,458
[45] Date of Patent: Oct. 15, 1996

[54] TIMING VALVE FOR THE DISCONTINUOUS METERING OF A VOLUME FLOW

[75] Inventors: Wolfgang Roth, Augsburg; Johannes Pfetzer, Bühl, both of Germany

[73] Assignee: Robert Bosch GmbH, Stuttgart, Germany

[21] Appl. No.: 387,787
[22] PCT Filed: Jul. 23, 1993
[86] PCT No.: PCT/DE93/00650
  § 371 Date: Apr. 6, 1995
  § 102(e) Date: Apr. 6, 1995
[87] PCT Pub. No.: WO94/04382
  PCT Pub. Date: Mar. 3, 1994

[30] Foreign Application Priority Data

Nov. 8, 1992 [DE] Germany ............... 42 26 531.2

[51] Int. Cl.⁶ ................... B60H 1/00; F01P 7/14
[52] U.S. Cl. ................... 137/115.06; 137/599.1; 137/625.29; 137/495; 251/129.03
[58] Field of Search ................... 137/110, 117, 137/495, 599.1, 625.29; 251/129.03

[56] References Cited

U.S. PATENT DOCUMENTS

| | | | |
|---|---|---|---|
| 2,782,610 | 2/1957 | Martin | 137/599.1 X |
| 2,836,197 | 5/1958 | Johnson | 137/599.1 X |
| 3,994,356 | 11/1976 | Smitley | 137/495 X |
| 4,361,170 | 11/1982 | Peloza | 137/625.29 |
| 4,466,457 | 8/1984 | Brane et al. | 137/625.29 X |
| 4,726,325 | 2/1988 | Itakura . | |
| 4,874,010 | 10/1989 | DeJong et al. | 137/110 X |
| 5,406,975 | 4/1995 | Nakamichi et al. | 251/129.03 X |

*Primary Examiner*—Stephen M. Hepperle
*Attorney, Agent, or Firm*—Michael J. Striker

[57] ABSTRACT

In a constant timing valve for the discontinuous metering of a volume flow, in particular the flow of cooling water flowing through a heat exchanger of a motor vehicle heater, the volume flow flowing through the valve outlet (17) is maintained constant regardless of the magnitude of the volume flow available at the inlet (16) in the valve housing (15) in that a bypass channel (28) is formed which leads from the inlet (16) to a return (18) and is closed by a spring-loaded, pressure-contro led bypass valve (29). The bypass valve (29) is designed in such a way that the excess volume flow flows off via the return (18) when the connection between the inlet (16) and outlet (17) is not blocked, at least after reaching a given minimum pressure in the bypass channel (28). The integrated bypass valve (29) is coupled with the timing valve (14) in such a way it is compulsorily pushed opened by the timing valve (14) when the timing valve (14) is closed (FIG. 1).

8 Claims, 3 Drawing Sheets

TIMING VALVE FOR THE DISCONTINUOUS METERING OF A VOLUME FLOW

PRIOR ART

The invention is directed to a timing valve for the discontinuous metering of a volume flow, in particular the flow of cooling water flowing through a heat exchanger of a motor vehicle heater as defined in the preamble of claim 1.

A known timing valve for metering the flow rate of the heating water or cooling water flowing through the heat exchanger of a motor vehicle heater and accordingly for adjusting the heating output is constructed as a magnetically actuated 2/2 directional control valve which is connected between the engine and the heat exchanger in the cooling water circuit of the internal combustion engine leading through the vehicle radiator. A bypass valve is arranged between the input of the 2/2 directional control valve and the output of the heat exchanger and directs the flow of cooling water directly to the input of the :radiator so as to bypass the heat exchanger when the 2/2 directional control valve is closed. Since the cooling water pump arranged in the cooling water circuit between the radiator and internal combustion engine is driven directly by the engine, the volume of the flow of heating water flowing through the heat exchanger in the open phase of the timing valve varies greatly depending on whether or not the engine is idling or at partial load or full load. Therefore, to ensure a constant heating output of the heat exchanger, the timing of the timing valve must also be adapted to the available cooling water and heating water.

ADVANTAGES OF THE INVENTION

The timing valve according to the invention with the characterizing features of claim 1 has the advantage over the prior art that a constant volume flow is always taken off at the outlet of the timing valve regardless of the volume flow available at the inlet of the timing valve. As applied to the heating system of a motor vehicle, this means that a constant flow of heating water always flows through the heat exchanger regardless of the respective operating state of the engine. When the engine is idling, i.e., at a low output of the cooling water pump and reduced cooling water flow at the inlet of the timing valve, the entire amount of available heating water flows through the heat exchanger when the valve element is open. At partial load or full load, a virtually constant portion of the cooling water flow circulated by the cooling water pump flows through the heat exchanger. The residual volume flows to the return via the bypass channel.

In a timing valve constructed in this way, the timing need only be adjusted corresponding to the desired heating temperature and need not also be additionally corrected as a function of the instantaneous operating state of the engine. This substantially simplifies the regulation of the timing of the timing valve for controlling the admission of hot water to the heat exchanger. Accordingly, at a preselected temperature, the timing can be maintained substantially constant and the timing ratio need only be manipulated when changing the desired heating temperature.

Advantageous further developments and improvements of the timing valve indicated in claim 1 are made possible by the steps contained in the additional claims.

In a preferred embodiment form of the invention, the volume flow removable at the outlet is maintained constant in that the bypass valve has a valve seat constructed in the bypass channel and a control cone which is placed on the valve seat by a closing spring. The valve element of the timing valve is arranged in a stationary manner and the control cone is arranged so as to be displaceable axially on a valve rod actuated by electromagnets. The control cone is supported at the valve rod at an annular shoulder so as to be acted upon by the closing spring. The closing force of the closing spring and the angle of taper of the control cone which is acted upon by the pressure in the bypass channel are adapted to one another in such a way that, as the volume flow increases at the inlet, the outlet cross section of the bypass valve is pushed open as a function of the pressure and the flow rate in the bypass channel until a residual volume flow exceeding the constant volume flow at the outlet flows off directly to the return.

According to a preferred embodiment form of the invention, the connection between the inlet and outlet is controlled by a seat valve in which the valve element which is arranged in a stationary manner on the valve rod is constructed as a truncated cone or frustum and in which the valve seat is arranged coaxially to the valve seat of the bypass valve at the valve housing.

DRAWING

The invention is explained more fully in the following description with reference to an embodiment example shown in the drawing.

FIG. 1 shows a block diagram of a heating system for a motor vehicle with a tinting valve shown schematically in longitudinal section;

FIGS. 2 to 4, respectively, show a longitudinal section of a timing valve according to a further embodiment example in three different switching states.

DESCRIPTION OF THE EMBODIMENT EXAMPLE

Figure 1:
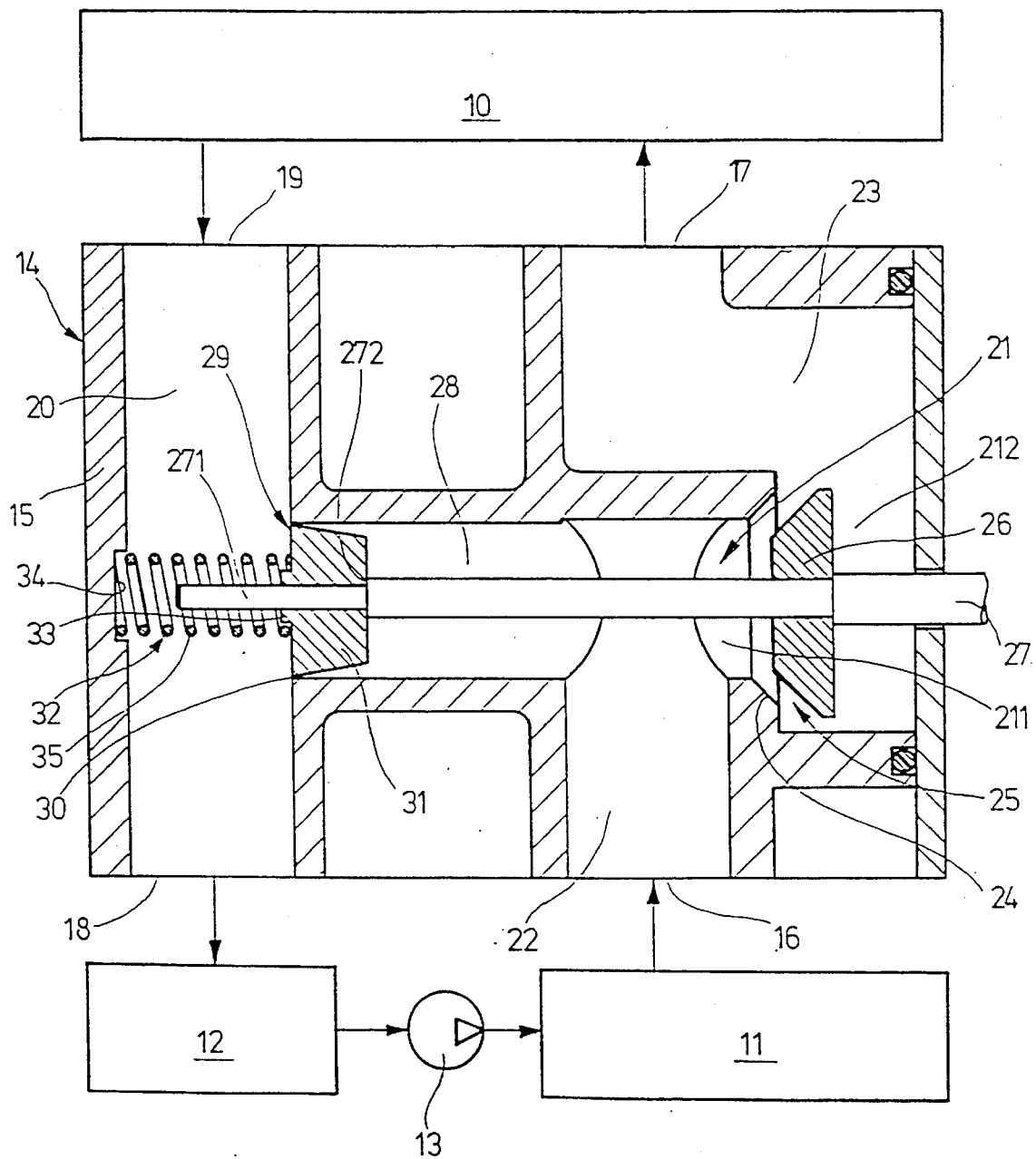

In the motor vehicle heating system shown in the block diagram in FIG. 1, a heat exchanger, designated by 10, is arranged in the cooling water circuit of the motor vehicle engine. Air flows through the heat exchanger 10 and is directed to the interior of the vehicle for heating purposes. The internal combustion engine is designated by 11, the radiator of the engine 11 is designated by 12 and the cooling water pump is designated by 13. A timing valve 14 is connected in the cooling circuit between the engine 11 and heat exchanger 10. When the timing valve 14 is open, the cooling water which is circulated by the cooling water pump 13 and heated in the engine 11 flows from the engine 11 via the timing valve 14 through the heat exchanger 10 as heating water and then returns through the timing valve 14 to arrive at the radiator 12, where it is cooled by the air flowing through the radiator 12 and then returns to the cooling water pump 13.

The timing valve 14 which is shown schematically in longitudinal section in the drawing has a valve housing 15 with an inlet 16, an outlet 17 and a return 18 and an additional connection 19. The inlet 16 is connected with the engine 11, the outlet 17 is connected with the input of the heat exchanger 10, the additional connection 19 is connected with the output of the heat exchanger 10 and the return 18 is connected with the radiator 12. A return duct 20 and a valve chamber 21 are constructed in the valve housing 15. The return duct 20 directly connects the additional connection 19 with the return 18, while the valve chamber 21 communicates with the inlet 16 via an inlet duct 22 and with the outlet 17 via an outlet duct 23. The valve chamber 21 is divided into two chamber portions 211 and 212 by a frustum-shaped valve seat 24 at the valve housing 10. Chamber portion 211 passes into the inlet duct 22 and chamber portion 212 passes into the outlet duct 23. The valve seat 24 forms part of a seat valve 25 whose frustum-shaped valve element 26, which cooperates with the valve seat 24, is arranged so as to be stationary on a valve rod 27. The valve rod 27 is driven by an electromagnet, not shown in FIG. 1, which lifts the valve element 26 from the valve seat 24 in one of two switching positions and accordingly opens the seat valve 25 and, in the other switching position, sets the valve element 26 on the valve seat 24 and accordingly closes the seat valve 25.

The chamber portion 211 connected with the inlet duct 22 is connected with the return duct 20 via a bypass channel 28. The bypass channel 28 is arranged coaxially to the valve seat 24 of the seat valve 25. The opening of the bypass valve 28 in the return duct 20 is closed by a bypass valve 29. The bypass valve 29 has a control cone 31 which is arranged at the opening of the bypass channel 28 and is held by a closing spring 32 in the closing position in which the channel opening is closed entirely or so as to leave a negligible annular gap 30. The surface of the control cone 31 acted upon by the pressure in the bypass 28 is constructed as a truncated cone. The closing spring 32 is constructed in the present case as a helical pressure spring 35 and is supported in the return duct 20 on one side at the control cone 31 by a guide pin 33 engaging over it and on the housing side in a guide groove 34 in the housing wall located opposite the control cone 31. The control cone 31 is arranged on the valve rod 27 so as to be displaceable axially, the valve rod 27 being guided through the bypass channel 28 up to the return duct 20. The end portion 271 of the valve rod 27 receiving the control cone 31 is reduced in diameter so as to form an annular shoulder 272, the control cone 31 being pressed against this annular shoulder 272 by the pressure spring 35.

In the open position of the timing valve 14 shown in the drawing, the seat valve 25 is open and the bypass valve 29 is closed. When the timing valve 14 is switched, the valve rod 27 is actuated by the electromagnet so as to switch into its other switching position in which the valve element 26 of the seat valve 25 is placed on the valve seat 24 to close the seat valve 25 and the control cone 31 is simultaneously displaced via the annular shoulder 272 against the force of the pressure spring 35 until the annular gap 30 opened by the control cone 31 at the opening of the bypass channel is at a maximum. In this case, the cooling water flowing into the timing valve 14 from the engine 11 via the inlet 16 is guided directly to the radiator 12 via the opened bypass valve 29. The heat exchanger 10 is switched off and the heating of the motor vehicle is stopped.

In heating operation, the timing valve 14 occupies the position shown in the drawing in which the cooling water 13 coming from the engine 11 is directed via the opened seat valve 25 into the heat exchanger 10 and then flows into the radiator 12 via connection 19, return duct 20 and return 18 in the timing valve 14. In order to set a desired heating output, the electromagnet of the timing valve is acted upon by exciting pulses so that the seat valve 25 and bypass valve 29 are opened and closed in opposite directions in a determined timing. In this way, a discontinuous metering of the heating water flowing through the heat exchanger 10 is achieved and a mean temperature of the heat exchanger 10 is accordingly adjusted.

It is well known that since the cooling water pump 13 is driven directly by the engine 11 the flow of cooling water available at the inlet 6 of the timing valve 14 differs greatly depending on whether the engine is idling or operating at partial load or full load. When there is little cooling water available (idling), the full amount of water flows through the opened seat valve 25 into the heat exchanger 10. Due to the low impact pressure in the valve chamber 21 and accordingly in the bypass channel 28, the spring-loaded control cone 31 of the bypass valve 29 remains in the closed position in which it blocks the bypass channel 28.

When there is a large amount of cooling water available at the inlet 16 (partial load or full load operation), a portion of the cooling water flows via the opened seat valve 25 to the outlet 17 of the timing valve 14 and into the heat exchanger 10. Owing to the increased pressure drop in the heat exchanger 10 and timing valve 14, a pressure develops in the bypass channel 28 such that the spring-loaded control cone 31 lifts off the valve seat 30 against the force of the closing spring 32 and accordingly opens the bypass channel 28. A partial flow of cooling water now flows directly via the bypass channel 28 to the return 18. The angle of taper of the surface of the frustum-shaped control cone 31 acted upon by pressure and the restoring force of the closing spring 32 are now adapted to one another in such a way that a constant volume flow always flows via the seat valve 25 to the outlet 17 when the seat valve 25 is open and the remaining residual volume flows off through the bypass channel 28. This setting of the bypass valve 29 is readily effected since the position of the control cone 31 and accordingly the resulting unblocked outlet cross section of the bypass valve 29 are dependent on the pressure and flow rate in the bypass channel 28.

The advantage in maintaining constant the volume flow passing through the seat valve 25 to the heat exchanger 10, as described above, by means of the change in the outlet cross section of the annular gap 30 at the bypass valve 29 as a function of the pressure in the bypass channel 28 consists in that the heat exchanger 10 is always acted upon by a constant volume of heating water regardless of the operating state of the engine. Therefore, to adjust the heating output of the heat exchanger 10, the timing valve 14 can be operated with virtually constant timing which need not be varied additionally corresponding to the heating water available at the inlet 16 of the timing valve 14 at the moment. The timing of the timing valve 14 need only be reset when a change in the heating output is desired.

Figure 2:
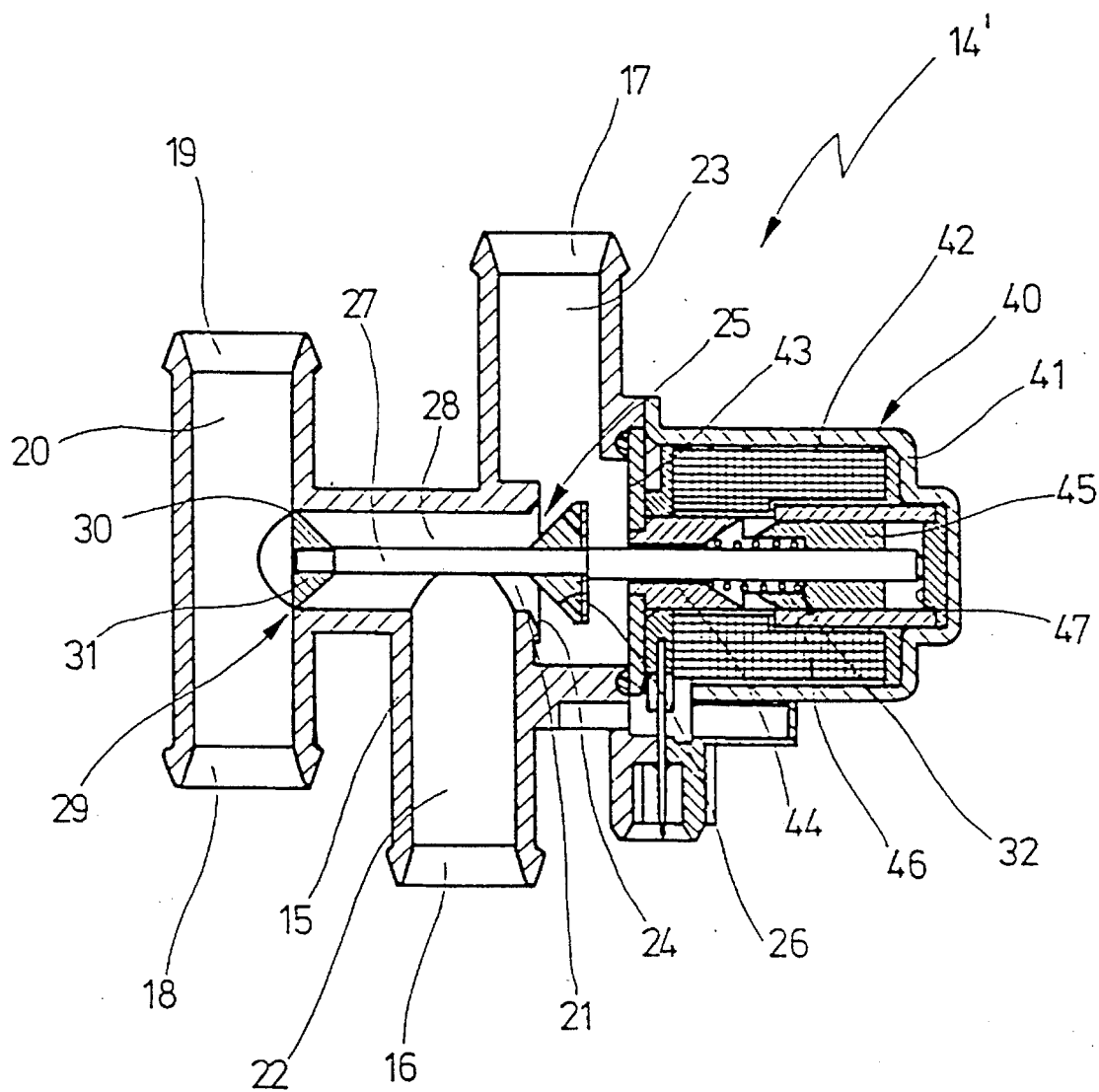
Figure 3:
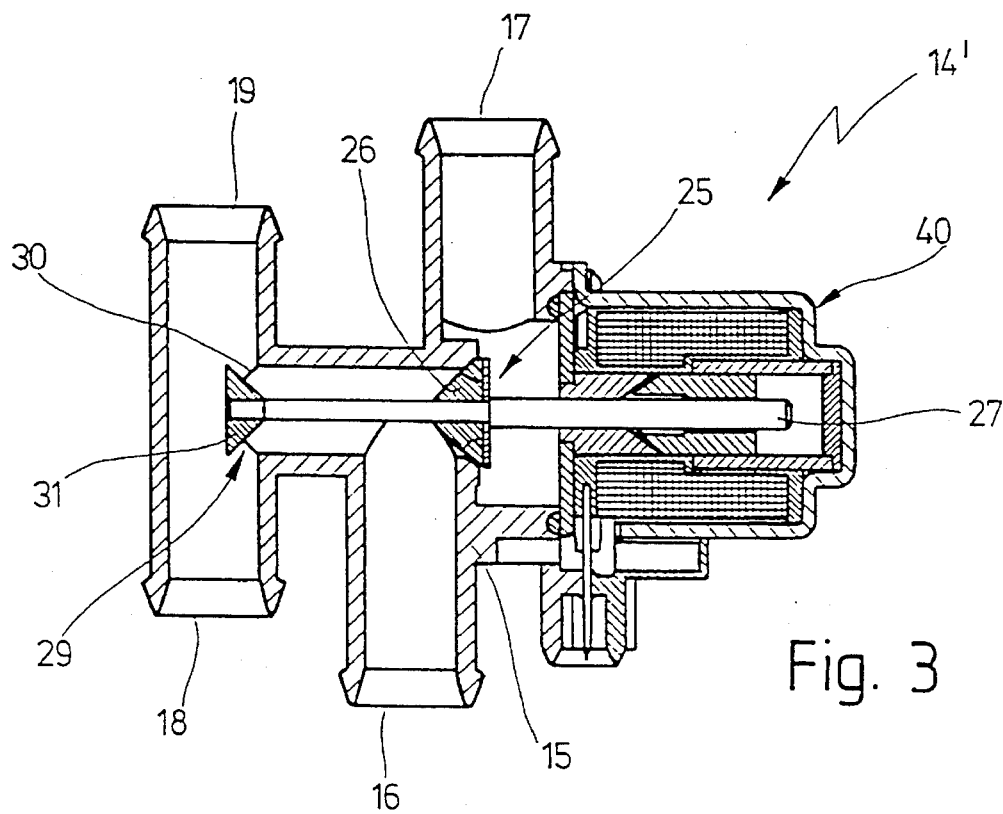

The timing valve 14' according to another embodiment example shown in longitudinal section in FIG. 2 differs from the timing valve 14 described above only with respect to the modified bypass valve 29. Structural component parts of timing valve 14' in FIG. 2 corresponding to those shown in FIG. 1 are provided with the same reference numbers. In the present instance, the control cone 31 of the bypass valve 29 is rigidly attached to the valve rod 27. The electromagnet 40 shown in section in this figure and having a construction which is known in the art has a magnet pot 41 which is flanged on at the valve housing and receives an annular exciter coil 42. The magnet pot 41 is closed by a disk-shaped rear closing yoke 43, a magnet core 44 projecting centrally from the latter into the interior of the exciter coil 42. The magnet core 44 encloses the valve rod 27 with play. A cylindrical armature 45 in the interior of the exciter coil 42 is connected in a stationary manner with the valve rod 27. A return spring 46 is supported between the armature 45 and the magnet core 44 and presses the valve rod 27 against a stop 47 at the magnet pot 41 in the unexcited state of the exciter coil 42. The valve element 26 of the seat valve 25 is fastened to the valve rod 27 in a stationary manner in such a way that the valve element 26 is lifted to the maximum extent from the valve seat 24 in this basic position of the valve rod 27, i.e., the seat valve 25 is completely opened. The control cone 31 of the bypass valve 29, which control cone 31 is likewise fastened to the valve rod 27 in a stationary manner, is arranged at a distance from the valve element 26 such that it closes the opening of the bypass channel 28 entirely in this basic position of the valve rod 27 or until only a negligible annular gap 30 remains. Accordingly, the return spring 46 at the same time forms the closing spring 32 of the bypass valve 29. When current is applied to the exciter coil the armature 45 is attracted by the magnet core 44 against the force of the return spring 46 and, in so doing, pushes the valve element 26 of the seat valve 25 onto the valve seat 24 via the valve rod 27. The seat valve 25 is accordingly closed. The control cone 31 is also displaced along with the valve rod 27 and opens the annular gap 30 at the output of the bypass channel 28 to the maximum outlet cross section (FIG. 3).

Figure 4:
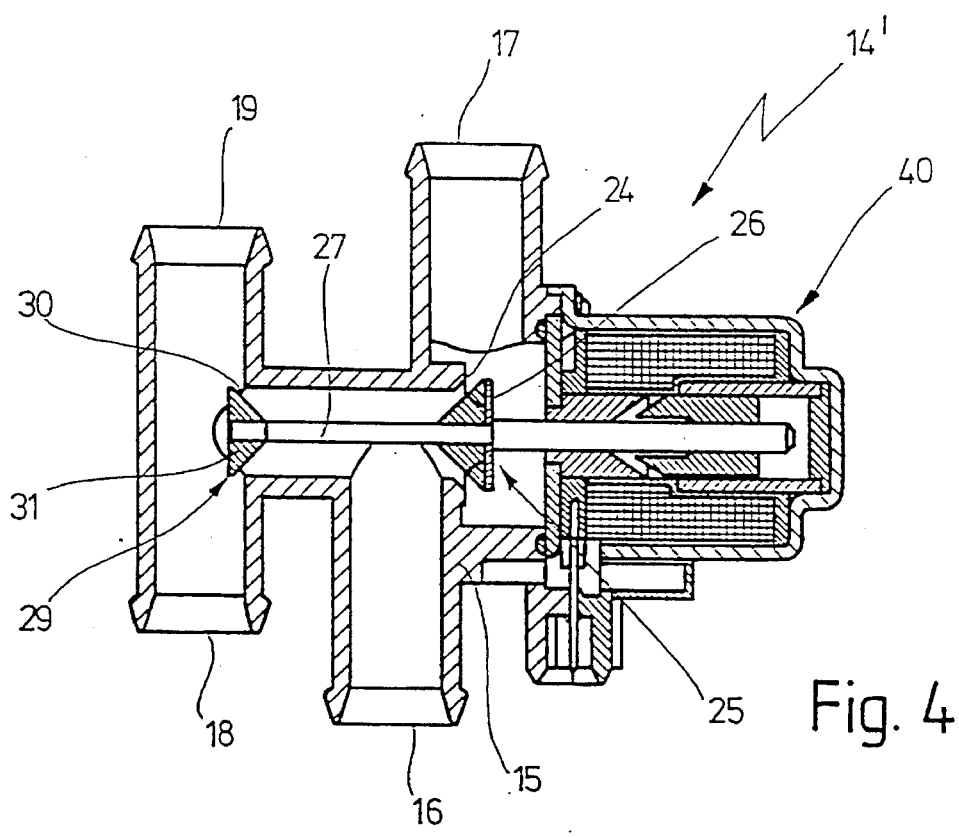

In the currentless state of the electromagnet 40, the valve rod 27 occupies the position shown in FIG. 2 when the amount of cooling water available at the inlet 16 is small. All of the cooling water flows via the fully opened seat valve 25 to the outlet 17. When the amount of cooling water available at the inlet 16 is large, a portion of the volume flow flows through the opened seat valve 25. Owing to the resulting impact pressure in the bypass channel 28, the dimensioning of the return spring 46 and the angle of taper of the surface of the control cone 31 acted upon by pressure, an ! additional partial flow of the volume flow flows through the widening annular gap 30 of the bypass valve 29. This state of the timing valve 14' is shown in FIG. 4. In this case also, the dimensions are effected in such a way that a constant volume of heating water always flows to the outlet 17, and accordingly to the heat exchanger, regardless of the cooling water available at the inlet 16 of the timing valve 14'.

We claim:

1. Timing valve for the discontinuous metering of a volume flow, in particular the flow of cooling water flowing through a heat exchanger of a motor vehicle heater, with a valve housing having an inlet and outlet and an electromagnetically actuated valve element which produces the connection between the inlet and outlet in a first switching position and blocks the connection in a second switching position, characterized in that a bypass channel (28) leading from the inlet (16) to a return (18) is constructed in the valve housing (15), in that a spring-loaded, pressure-controlled bypass valve (29) is arranged in the bypass channel (28) and is constructed in such a way that a virtually constant volume flow flows to the outlet (17) regardless of the volume flow at the inlet (16) when the connection is produced between the inlet (16) and outlet (17) at least when a given minimum pressure is reached in the bypass channel (28), and in that the bypass valve (29) is coupled with the valve element (26) in such a way that it is compulsorily opened in its second switching position.

2. Timing valve according to claim 1, characterized in that the valve element (26) is arranged so as to be stationary on a valve rod (27) actuated by an electromagnet (40) and cooperates with a valve seat (24) constructed in the valve housing (15) so as to form a seat valve (25) in combination with the valve seat (24), in that the bypass valve (29) has a control cone (31) which is acted upon by the pressure in the bypass channel (28) and in the opposite direction by a closing spring (32), and in that the closing force of the closing spring (32) and the angle of taper of the surface of the control cone (31) acted upon by pressure are adapted to one another in such a way that the outlet cross section of the bypass valve (29) is opened as a function of the pressure and the flow rate in the bypass channel (28) until the differential volume flow of the volume flow available at the inlet (16) and the constant volume flow removed at the outlet (17) always flows off to the return (18).

3. Timing valve according to claim 2, characterized in that the closing spring (32) is constructed as a pressure spring (35) supported at the valve housing (15) and at the end face of the control cone (31) remote of the bypass channel (28), and in that the control cone (31) is arranged on the valve rod (27) so as to be displaceable axially and is pressed against an annular shoulder (272) formed at the valve rod (27) by the pressure spring (35).

4. Timing valve according to claim 2, characterized in that the control cone (31) is fastened to the valve rod (27) so as to be fixed with respect to axial displacement, and in that the closing spring (32) is formed by a return spring (46) acting on the valve rod (27), which return spring (46) lifts the valve element (26) of the seat valve (25) from the valve seat (24) in the unexcited state of the electromagnet (40).

5. Timing valve according to claim 4, characterized in that the return spring (46) is integrated in the electromagnet (40) and is supported as a pressure spring at an armature (45) which is connected with the valve rod (27) in a stationary manner.

6. Timing valve according to (claim 3), characterized in that the control cone (31) of the bypass valve (29) which is arranged on the valve rod (27) so as to be stationary and contacts the annular shoulder (272) is arranged at a distance from the valve element (26) of the seat valve (25) arranged on the valve rod (27) so as to be stationary such that the control cone (31) of the bypass valve (29) closes the bypass channel (28) when the valve element (26) of the seat valve (25) is lifted from the valve seat (24) to the maximum extent and opens the bypass channel (28) to the maximum extent when the valve element (26) of the seat valve (25) is placed on the valve seat (24).

7. Timing valve according to claim 1, characterized in that the valve housing (15) has another connection (19) which is connected with the return (18) via a return duct (20) constructed in the valve housing (15), and in that the bypass channel (28) opens into the return duct (20).

8. Timing valve according to claim 2, characterized in that a valve chamber (21) is formed in the valve housing (15) and is divided into two chamber portions (211, 212) by the valve seat (24) of the seat valve (25), and in that the inlet (16), by way of inlet duct (22), and the bypass channel (28) communicate with one chamber portion (211) and the outlet (17) communicates with the other chamber portion (212) via an outlet duct (23).

* * * * *